US010066658B1

(12) United States Patent
LeCompte et al.

(10) Patent No.: US 10,066,658 B1
(45) Date of Patent: Sep. 4, 2018

(54) NON-ROTATABLE FASTENER ASSEMBLY AND ASSOCIATED METHODS (71) Applicant: YKK Corporation of America, Marietta, GA (US)

(72) Inventors: Chuck G. LeCompte, Frankfort, KY (US); Jonathan H. Sharp, Lawrenceburg, KY (US)

(73) Assignee: YKK Corporation of America, Marietta, GA (US)

( * ) Notice: Subject to any disclaimer, the term of this patent is extended or adjusted under 35 U.S.C. 154(b) by 0 days.

(21) Appl. No.: 15/665,800

(22) Filed: Aug. 1, 2017

(51) Int. Cl.
*F16B 39/08* (2006.01)
*F16B 43/00* (2006.01)
*F16B 39/26* (2006.01)
*F16B 39/10* (2006.01)

(52) U.S. Cl.
CPC ............ *F16B 39/08* (2013.01); *F16B 43/001* (2013.01); *F16B 39/105* (2013.01); *F16B 39/26* (2013.01)

(58) Field of Classification Search
CPC ........ F16B 39/08; F16B 39/26; F16B 39/105; F16B 43/001
See application file for complete search history.

(56) References Cited

U.S. PATENT DOCUMENTS

| | | | | | |
|---|---|---|---|---|---|
| 1,594,416 | A | * | 8/1926 | Kellog | A44B 1/30 24/105 |
| 2,174,521 | A | * | 10/1939 | Lancaster | A44B 1/30 24/105 |
| 2,279,259 | A | * | 4/1942 | Ballou, Jr. | A44C 3/001 24/105 |
| 2,665,729 | A | * | 1/1954 | Terry | F16B 39/24 411/152 |
| 2,783,810 | A | * | 3/1957 | Wrigley | A47K 13/26 4/237 |
| 3,457,601 | A | * | 7/1969 | Prym | A44B 17/0005 24/104 |
| 4,607,415 | A | * | 8/1986 | Fukuroi | A44B 1/44 24/113 R |
| 4,708,555 | A | * | 11/1987 | Terry | F16B 39/24 411/149 |
| 4,744,187 | A | * | 5/1988 | Tripp | E04D 5/143 411/179 |

(Continued)

FOREIGN PATENT DOCUMENTS

| | | |
|---|---|---|
| JP | H11-346809 A | 12/1999 |
| JP | 4143994 B2 | 6/2008 |

(Continued)

*Primary Examiner* — David M Upchurch
(74) *Attorney, Agent, or Firm* — Kilpatrick Townsend & Stockton LLP (57) ABSTRACT

A cap and washer fastener assembly includes a cap with an upper surface and a lower surface with a post extending from the lower surface. The assembly also includes a washer with an upper surface, a lower surface, and a hole. The assembly includes an assembled configuration wherein the post of the cap is inserted into the hole of the washer and a portion of the post is permanently deformed within the cavity. In the assembled configuration, a substrate layer is disposed between the cap and the washer. The cap and washer are configured so they are prevented from rotating relative to one another and relative to the substrate when in the assembled configuration.

20 Claims, 10 Drawing Sheets

(56) References Cited

U.S. PATENT DOCUMENTS

| | | | | |
|---|---|---|---|---|
| 5,134,757 A * | 8/1992 | Johnson | A44B 99/005 | 24/573.11 |
| 5,239,135 A * | 8/1993 | Phillips, II | H05K 3/301 | 174/267 |
| 5,375,302 A * | 12/1994 | Takamura | A44B 17/0011 | 24/114.05 |
| 5,490,309 A * | 2/1996 | Velasquez | A41B 11/002 | 24/102 SL |
| 5,517,730 A * | 5/1996 | Ho | A44B 1/12 | 24/108 |
| 5,644,820 A * | 7/1997 | Ho | A44B 1/12 | 24/113 MP |
| 5,933,929 A * | 8/1999 | Kawakami | A44B 17/0035 | 24/324 |
| 5,940,940 A * | 8/1999 | Tanikoshi | A44B 17/0082 | 24/108 |
| 6,266,853 B1 | 7/2001 | Ho | | |
| 7,189,024 B2 * | 3/2007 | Cameron | E04H 15/64 | 135/118 |
| 8,522,403 B2 * | 9/2013 | Hayashi | A44B 1/34 | 24/101 R |
| 2002/0029444 A1 * | 3/2002 | Lyle | A44B 17/0029 | 24/621 |
| 2007/0084023 A1 * | 4/2007 | Fisher | A44B 17/0035 | 24/114.4 |
| 2012/0124791 A1 * | 5/2012 | Hasegawa | A44B 17/007 | 24/596.1 |
| 2012/0180266 A1 * | 7/2012 | Hasegawa | A41H 37/04 | 24/96 |
| 2012/0297588 A1 * | 11/2012 | Hasegawa | A44B 17/0005 | 24/595.1 |
| 2012/0298308 A1 * | 11/2012 | Hasegawa | A41H 37/00 | 156/514 |
| 2013/0117972 A1 * | 5/2013 | Hasegawa | A44B 1/42 | 24/578.11 |
| 2015/0272283 A1 * | 10/2015 | Chan | A44B 17/0047 | 24/573.11 |

FOREIGN PATENT DOCUMENTS

| | | |
|---|---|---|
| JP | 5306462 B2 | 7/2013 |
| JP | 2015-23983 A | 2/2015 |
| JP | 2016-49344 A | 4/2016 |
| KR | 101490874 B1 | 2/2015 |

* cited by examiner

NON-ROTATABLE FASTENER ASSEMBLY AND ASSOCIATED METHODS

FIELD OF THE INVENTION

This invention relates to cap and washer fastener assemblies for reducing or eliminating rotation of the cap relative to the washer and/or a substrate layer disposed between the cap and the washer.

BACKGROUND

Numerous devices utilize cap and washer fastener assemblies for various purposes including, for example, attaching objects and marking or identifying locations. For example, in the automotive and other similar industries, cap and washer fastener assemblies may be installed on a seat or other component with the cap and washer on opposite surfaces of a substrate (such as a seat fabric) to mark/identify a location for a function or feature of the seat (e.g., identifying attachment locations for child car seats). After the cap and washer fastener assembly has been attached, the cap should be on the outer surface of the seat and visible for users. Conventional caps, however, often move or rotate relative to the washer and/or the seat such that a visible indicia on the cap difficult to discern and/or is not easily recognizable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Versions of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, a cap and washer fastener assembly comprises: a cap with an upper surface and a lower surface, wherein a post extends from the lower surface; and a washer with an upper surface, a lower surface, and a hole extending through the upper surface and the lower surface, wherein: the upper surface of the washer comprises an outer portion; the lower surface of the washer comprises a cavity that is coaxial with the hole; the cap and washer fastener assembly comprises an assembled configuration wherein: (a) the post of the cap is inserted into the hole of the washer and a portion of the post is permanently deformed within the cavity; and (b) a substrate layer is disposed between the cap and the washer such that the lower surface of the cap interfaces with the substrate layer and the upper surface of the washer interfaces with the substrate layer; and the outer portion comprises a plurality of serrations that increase friction with the substrate layer when the cap and washer fastener assembly is in the assembled configuration.

According to certain examples, a fastener comprises: a washer with an upper surface, a lower surface, and a hole extending through the upper surface and the lower surface, wherein: the upper surface of the washer comprises a center hub that is coaxial with the hole; the lower surface of the washer comprises a cavity that is coaxial with the hole; the fastener comprises an assembled configuration wherein the washer interfaces with a substrate layer such that the upper surface of the washer interfaces with the substrate layer; the upper surface of the washer comprises a plurality of serrations configured to increase friction with the substrate layer when the fastener is in the assembled configuration; and the washer comprises at least one of: a plurality of radial protrusions that extend in a radial direction toward a central axis of the hole; and a plurality of projections disposed within the cavity adjacent the hole and extending parallel to an axial direction of the hole.

According to certain examples, a fastener comprises: a washer with an upper surface, a lower surface, and a hole extending through the upper surface and the lower surface, wherein: the lower surface of the washer comprises a cavity that is coaxial with the hole; the fastener comprises an assembled configuration wherein the washer is disposed adjacent to a substrate layer; the hole comprises a plurality of radial protrusions that extend in a radial direction toward a central axis of the hole; and the cavity comprises a plurality of projections disposed adjacent the hole extending in a projection direction that is approximately parallel to an axial direction of the hole.

Also disclosed are methods of assembling the cap and washer fastener assemblies described herein.

BRIEF DESCRIPTION OF THE DRAWINGS

Illustrative embodiments of the present disclosure are described in detail below with reference to the following drawing figures.

DETAILED DESCRIPTION

The subject matter of versions of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "upper," "lower," "front," and "rear," among others are intended to refer to the orientation as illustrated and described in the figure (or figures) to which the components and directions are referencing.

FIGS. 1-8C illustrate non-limiting examples of a cap and washer fastener assembly 100. As shown, the cap and washer fastener assembly 100 may include a washer 101 on a rear side of the assembly and a cap 201 on a front side of the assembly with a layer 10 disposed between the washer 101 and the cap 201. The substrate layer 10 may be fabric (such as cloth, fabric, leather, synthetic materials, or any other appropriate material) for a seat, a seat cover, or any other appropriate object.

Figure 1:
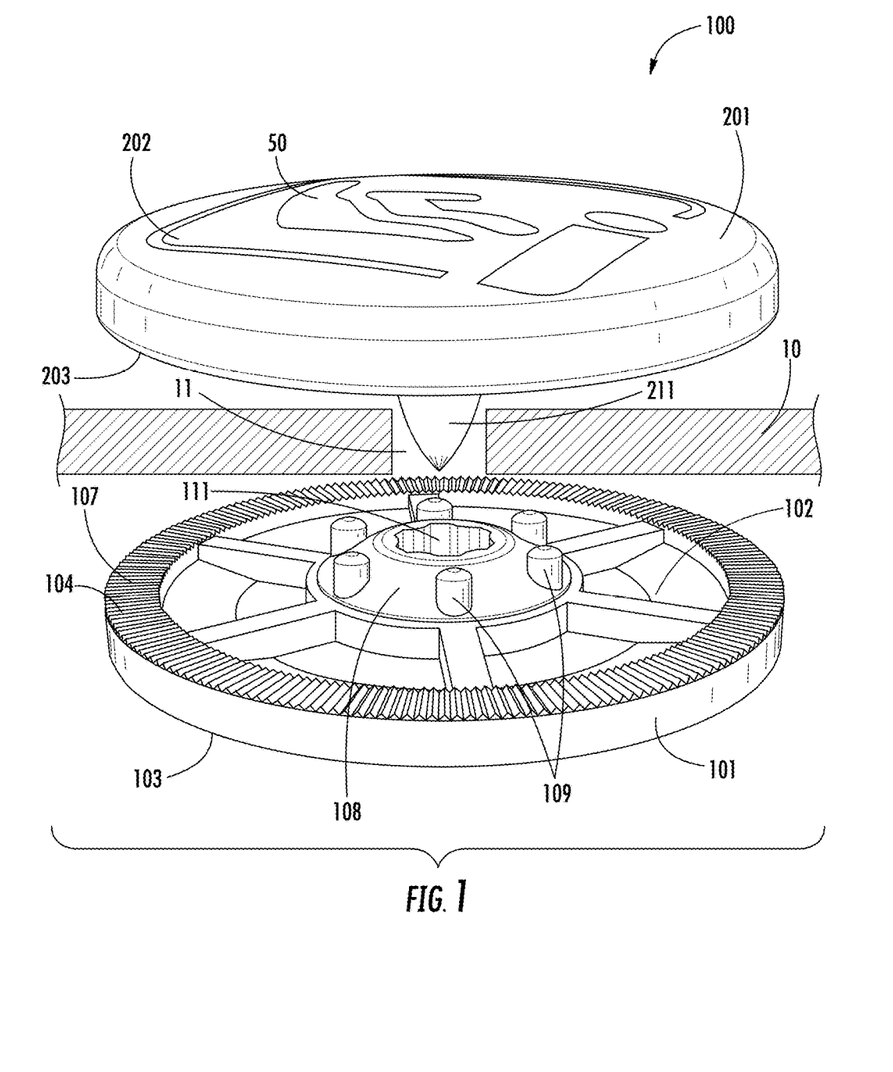
FIG. 1 is a top perspective exploded view of a cap and washer fastener assembly according to certain aspects.

For example, an exploded view of a cap and washer fastener assembly 100 is shown in FIG. 1. The cap 201 may include an upper surface 202 having a visual indicia 50 that includes at least one of symbols, letters, words, numbers, pictograms, emblems, pictographs, graphics, or the like, and combinations thereof. The visual indicia 50 may indicate a location for an object/device (e.g., attachment provisions for a child car seat) and/or may convey a message. In some embodiments, due to the visual indicia 50, the cap 201 includes a specific desired orientation and not rotate after attachment to the washer 101 because rotation may alter the meaning of the visual indicia 50 and/or make the visual indicia 50 unreadable. As shown in FIG. 3B, a lower surface 203 of the cap 201 may include a recessed central area 206 and a post 211 extending from the central area 206. In some examples, the post 211 extends from a center of the lower surface 203.

Figure 2A:
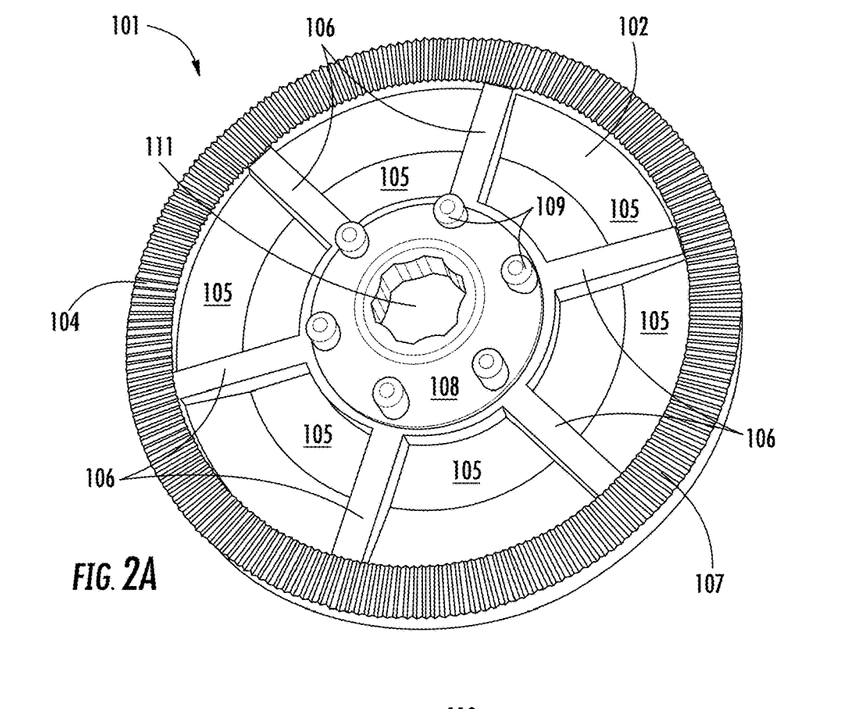
FIG. 2A is a top perspective view of a washer of the cap and washer fastener assembly of FIG. 1.
Figure 2B:
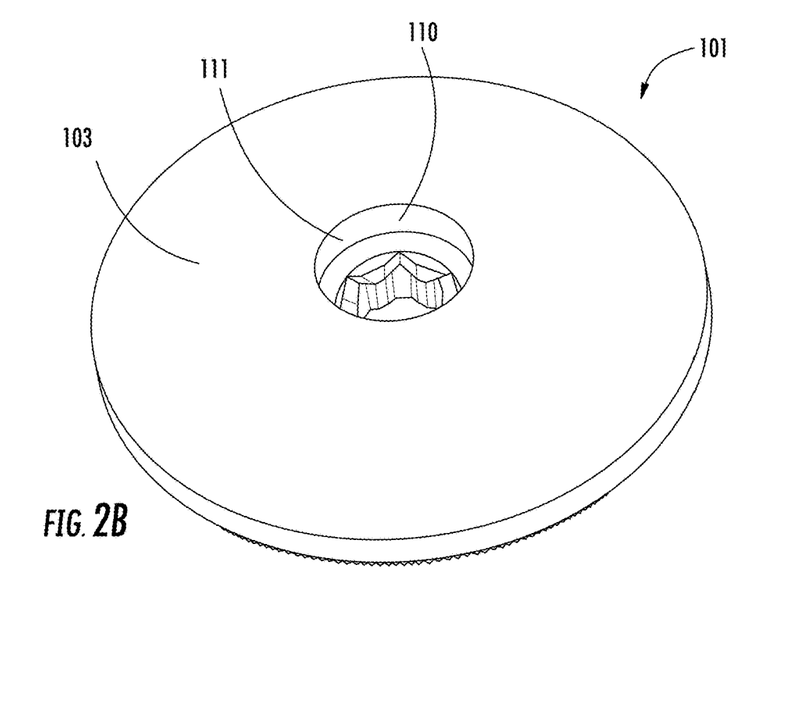
FIG. 2B is a bottom perspective view of the washer of FIG. 2A.
Figure 2C:
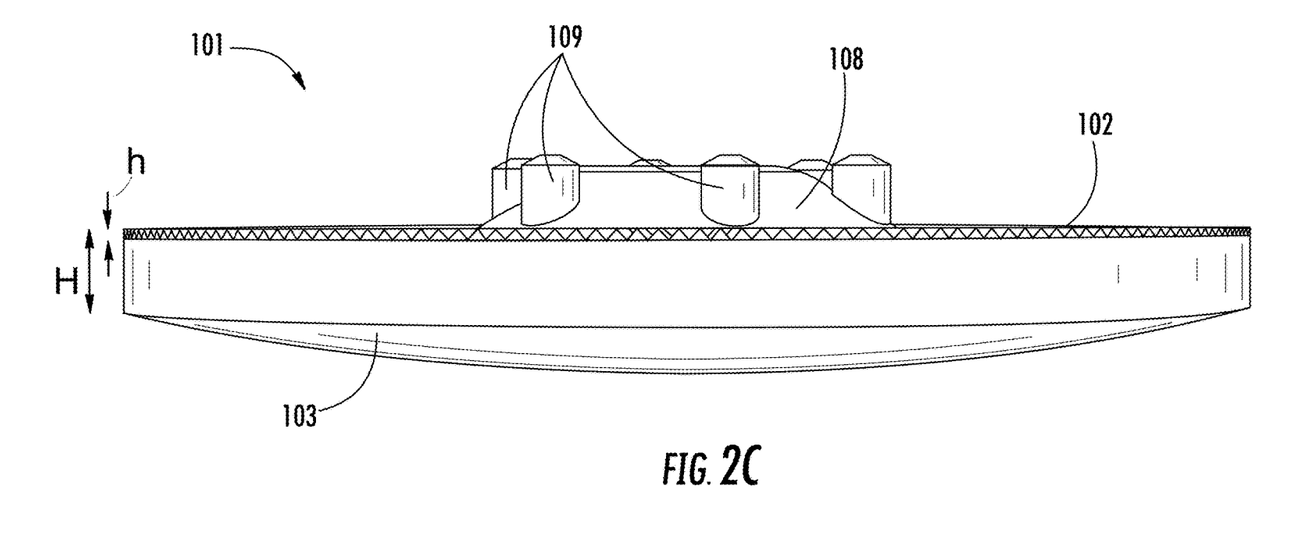
FIG. 2C is a side view of the washer of FIG. 2A.

As shown in FIGS. 1 and 2A, the washer 101 may include an upper surface 102, a lower surface 103, and a hole 111. As illustrated, the hole extends through the upper surface 102 and through the lower surface 103. In some examples, the hole 111 is disposed in a center of one or both of the upper surface 102 and the lower surface 103. The washer 101 may also include a center hub 108 on the upper surface 102 side of the washer 101. The center hub 108, in some cases, includes a plurality of protrusions 109 extending therefrom. On the lower surface 103 side and coaxial with the hole 111, the washer 101 may include a cavity 110 that is similar to a counter bore or countersink, as shown in FIG. 2B. In some examples, when the cap and washer fastener assembly 100 is assembled (see FIGS. 8A-8C), the protrusions 109 are pressed into the layer 10 between the washer 101 and the cap 201. The protrusions 109 of the washer 101 may be arranged such that they press through the layer 10 and engage a label 205 (see FIG. 3B) of the cap 201 when the cap and washer fastener assembly 100 is assembled. Although the protrusions 109 are illustrated as cylindrical with a conical portion at the end of each protrusion 109, the protrusions 109 may have any appropriate shape. The layer 10 is not shown in FIGS. 8A-8C for clarity.

In addition, as shown in FIGS. 1, 2A, 4, and 8C, the washer 101 may include an outer portion 104 that has a flat ring or annulus shape on the upper surface 102 and that includes a plurality of serrations 107. The serrations 107 are illustrated on the washer 101 but may be present on one or both of the washer 101 and the cap 201. The serrations 107 embed within or engage the layer 10 and thus increase friction between (1) the washer 101 (or the cap 201) and (2) the layer 10 (when the cap and washer fastener assembly 100 is in the assembled configuration). In some examples, some or all of the serrations 107 extend to the outermost edge of the upper surface 102. In some cases, a height h of the serrations 107 is approximately 1-50% of the edge height H of the washer 101 (see FIG. 2C). The height h of the serrations 107 may be approximately 10-50% of the edge height H of the washer 101. In certain cases, the height h of the serrations 107 is approximately 30-40% of the edge height H of the washer 101.

Between the center hub 108 and the outer portion 104, as shown in FIG. 2A, the washer 101 may include recessed portions 105 separated by members 106. If included, the recessed portions 105 reduce material volume for the washer 101, which increases efficiency based on weight, materials necessary, and for manufacturing processes (including materials needed and cooling processes associated with the washer 101).

Figure 4:
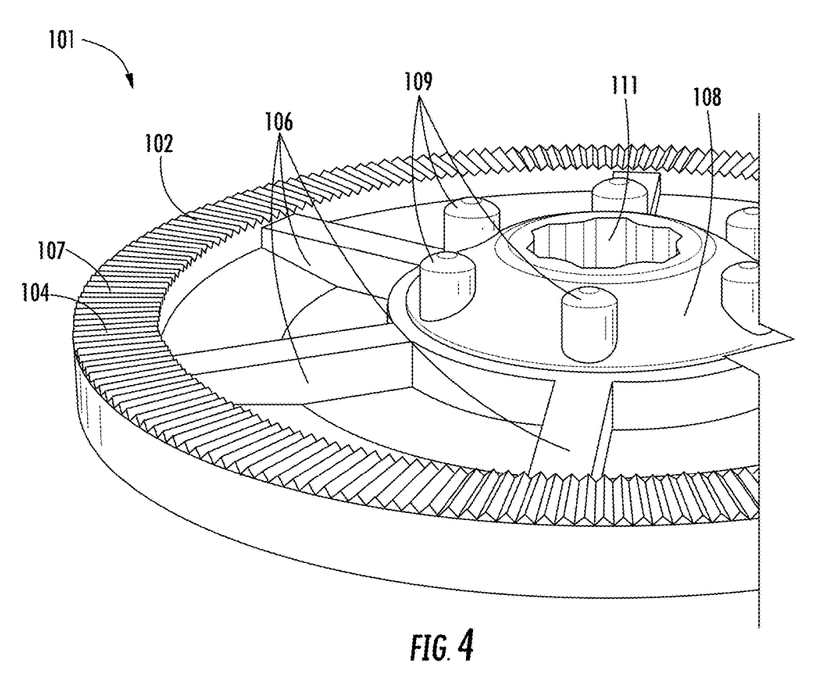
FIG. 4 is a partial top perspective view of the washer of FIG. 2A.

As shown in FIG. 4, the serrations 107 may have a saw-tooth or triangular shaped cross section where an exposed portion of the serrations (that interfaces with the layer 10) has a pointed tip or edge. The serrations 107 may be triangular prismatic protrusions, as illustrated in FIG. 4. In some examples, each serration 107 extends the full radial dimension of the outer portion 104 (as illustrated), while, in other examples, multiple serrations 107 may be arranged in the radial direction of the outer portion 104. The serrations 107 may have any appropriate shape including having an upper extremity that is a rounded or flat exposed surface/edge. The serrations 107 may be conical, pyramidal, spherical, cubic, prismatic, cylindrical, or any other appropriate shape. In some examples, the serrations 107 appear similar to gear teeth.

Figure 3A:
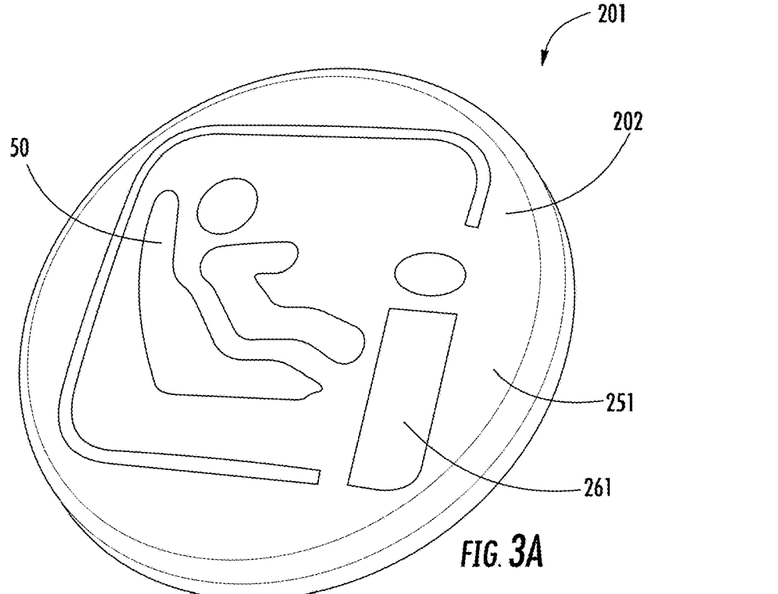
FIG. 3A is a top perspective view of a cap of the cap and washer fastener assembly of FIG. 1.
Figure 3B:
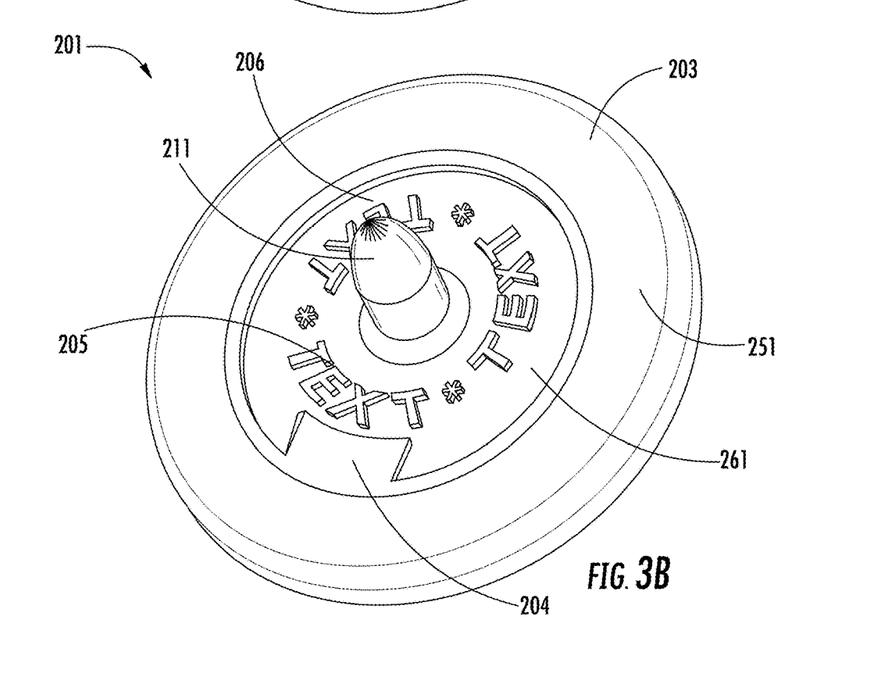
FIG. 3B is a bottom perspective view of the cap of FIG. 3A.
Figure 3C:
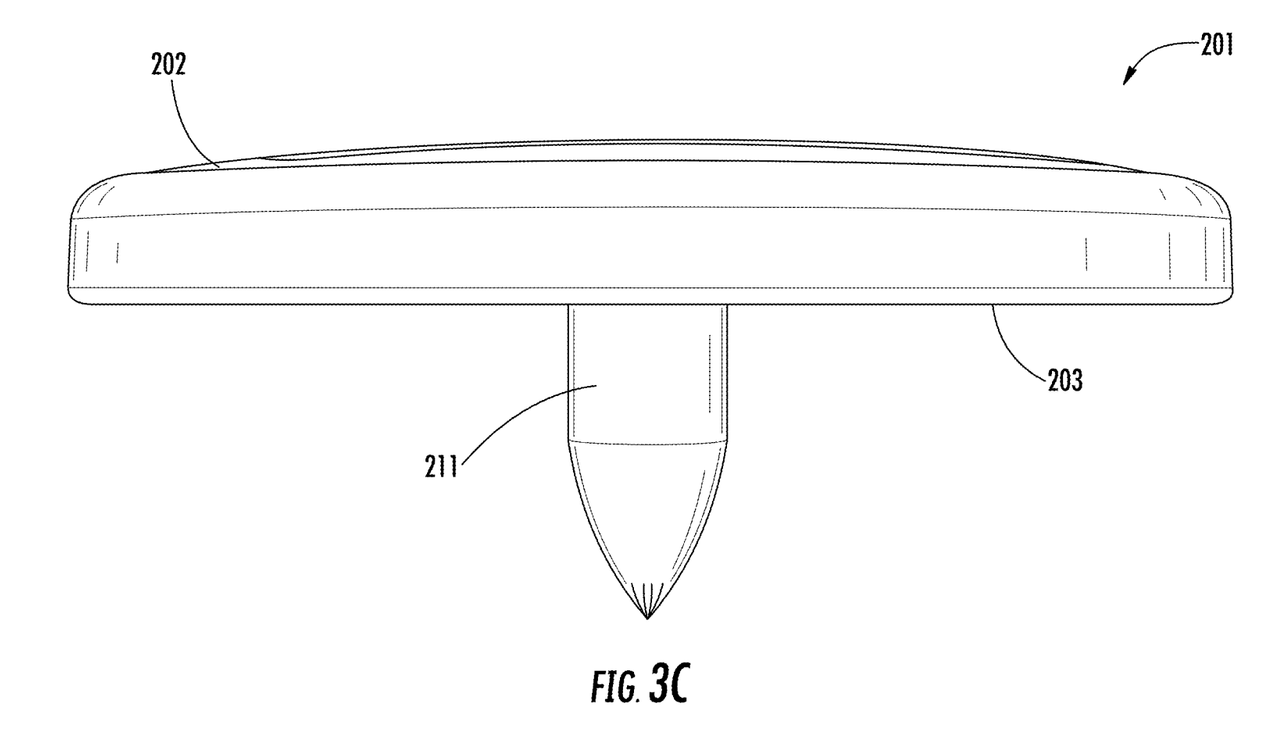
FIG. 3C is a side view of the cap of FIG. 3A.

The cap 201, as shown in FIGS. 3A and 3B, may include multiple different materials or components, although it need not. In some examples, the cap 201 is molded using a first material 251 and a second material 261 where the first material 251 forms most of the upper surface 202 and the lower surface 203 (other than recessed central area 206). The second material 261 may form at least one of the post 211, the visual indicia 50, and the recessed central area 206. In some cases, the second material 261 is a different color than the first material 251 to enhance visibility of the visual indicia 50. As shown in FIG. 3B, the lower surface 203 may include a protrusion 204 for locating the cap 201 (e.g., when the visual indicia 50 has a desired orientation, the protrusion 204 may be used to orient the cap 201, which would otherwise rotate about post 211). In some cases, the protrusion 204 is approximately rectangular, although it may be any suitable shape. The protrusion 204 may partially embed within the layer 10 and thus increase friction between the cap 201 and the layer 10 when the cap and washer fastener assembly 100 is in the assembled configuration.

In addition, the lower surface 203 may include the label 205, which may include raised symbols, letters, words, graphics, and/or numbers. The label 205 may include information related to product type, manufacturer information, and/or any other relevant data or information. The label 205 may include portions that are raised from the lower surface 203 and/or the recessed central area 206, although this is not required. In cases where the label 205 is raised from the surface, the label 205 may partially embed within the layer 10 and thus increase friction between the cap 201 and the layer 10 when the cap and washer fastener assembly 100 is in the assembled configuration. In some examples, the label 205 engages the protrusions 109 of the washer 101 when the cap and washer fastener assembly 100 is assembled.

Figure 5A:
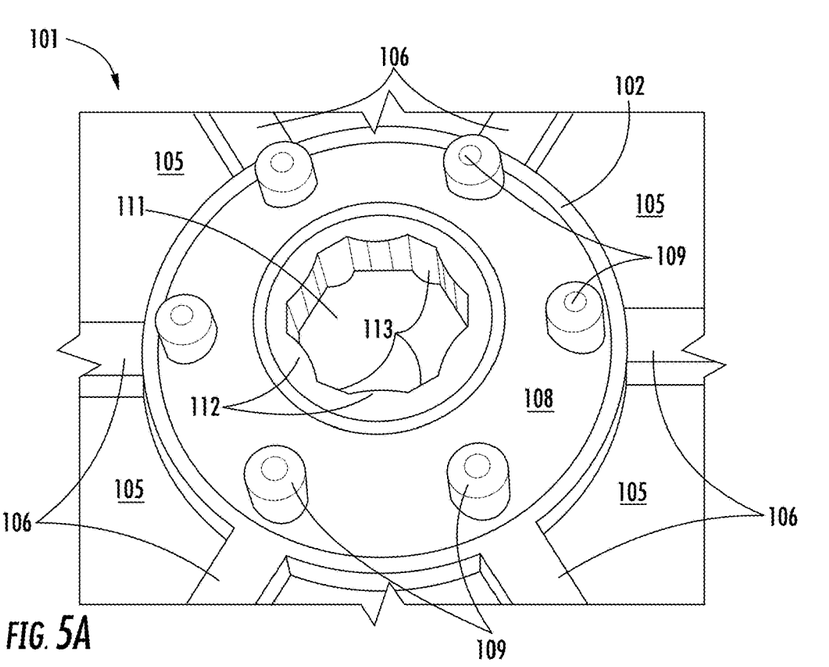
FIG. 5A is a partial top perspective view of the washer of FIG. 2A.
Figure 5B:
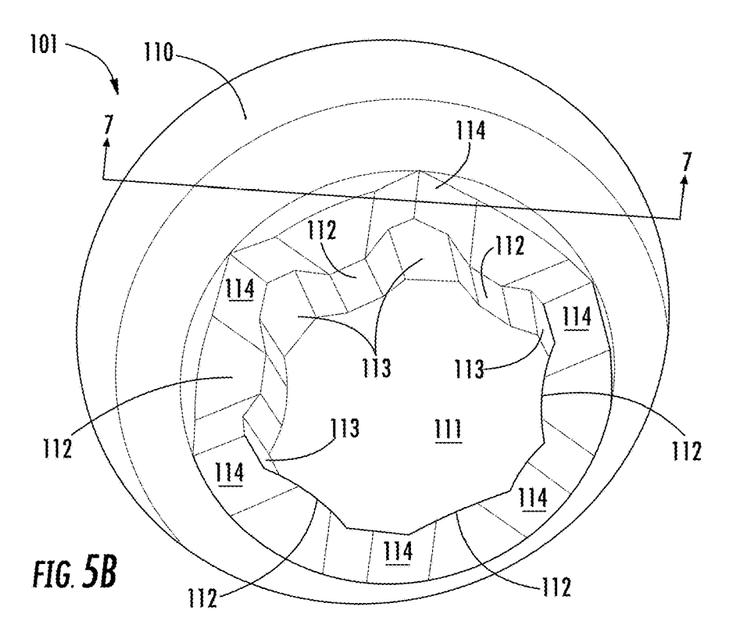
FIG. 5B is a partial bottom perspective view of the washer of FIG. 2A.
Figure 6:
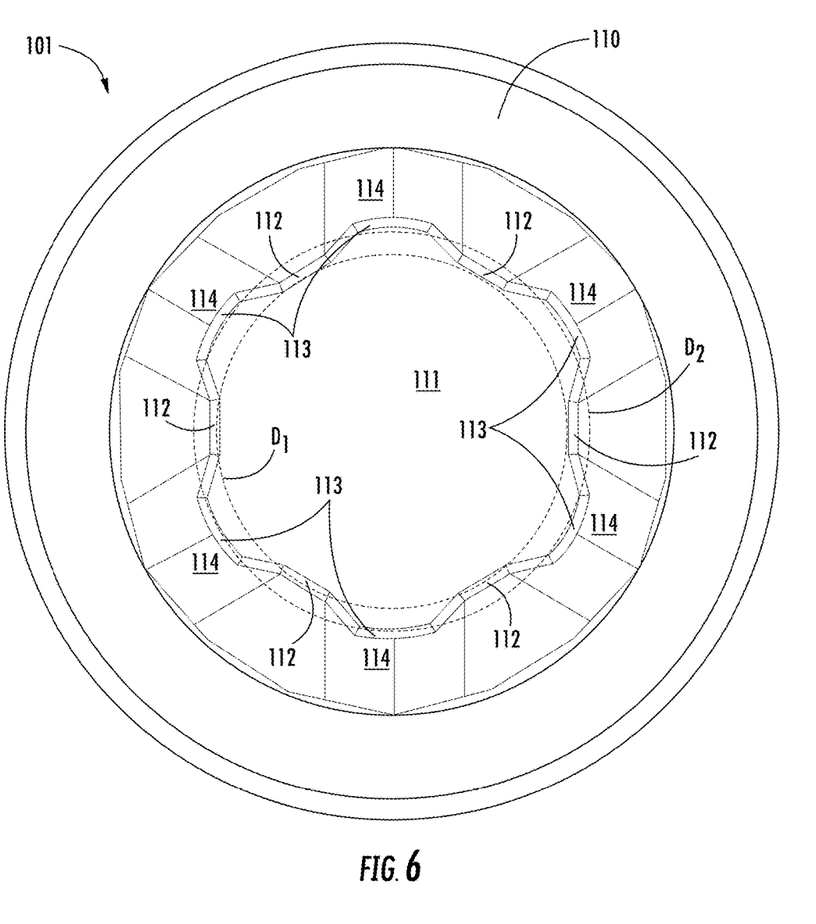
FIG. 6 is a partial bottom view of the washer of FIG. 2A.

As shown in FIGS. 5A-5B and 6, in some examples, the hole 111 of the washer 101 is not round (i.e., does not have a circular cross section). The hole 111 may include at least one radial protrusion 112 that extends in a radial direction toward a central axis of the hole 111. Located adjacent to (or in between) the radial protrusion(s) 112 is at least one recess 113. In some examples, the radial protrusion(s) 112 and the recess(es) 113 extend perpendicular to the axial direction of the hole 111 and the post 211. As shown in FIG. 6, the radial protrusion(s) 112 define a first diameter $D_1$ for the hole 111 and the recess(es) 113 define a second diameter $D_2$ for the hole 111. In some examples, the washer 101 includes six radial protrusions 112 and six recesses 113, however the washer 101 may have any appropriate number of radial protrusions 112 and recesses 113.

Figures 8A, 8B:
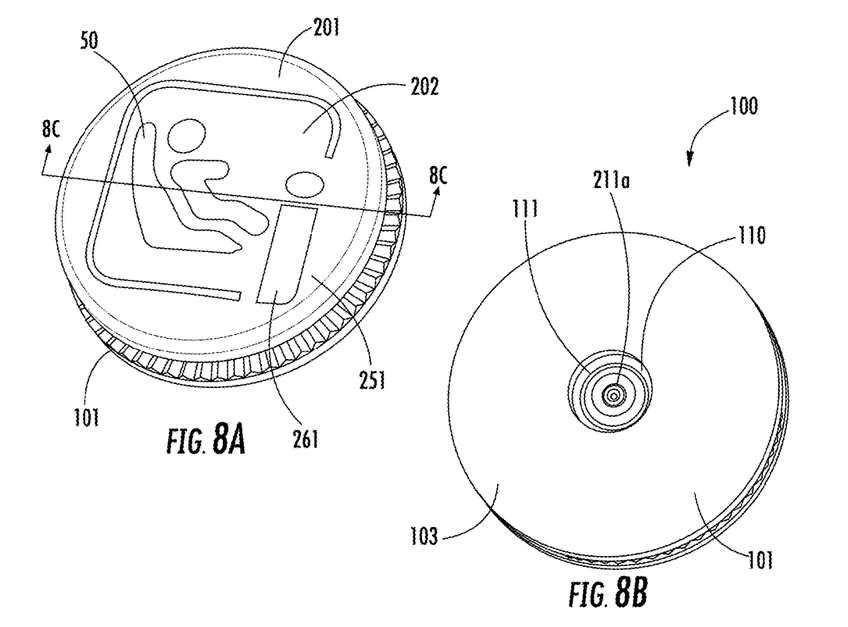
FIG. 8A is a top perspective assembled view of the cap and washer fastener assembly of FIG. 1.
FIG. 8B is a bottom perspective view of the cap and washer fastener assembly of FIG. 8A.
Figure 8C:
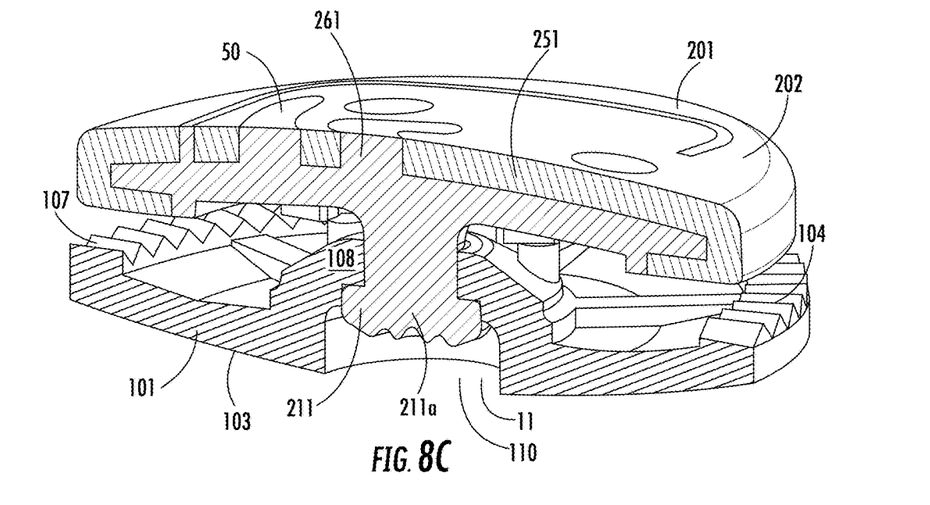
FIG. 8C is a cross section view of the cap and washer fastener assembly of FIG. 8A taken along line 8C-8C.

In some examples, the post 211 of the cap 201 may have an outer diameter that is approximately equal to $D_1$, while in other examples the post 211 has an outer diameter that is greater than $D_1$ but is less than $D_2$. As shown in FIGS. 8B and 8C, when the cap and washer fastener assembly 100 is assembled, the post 211 is inserted into hole 111 and the end of the post 211 is pressed until it permanently deforms in the cavity 110 adjacent to the lower surface 103 (i.e., the end of the post 211 mushrooms within the cavity 110). The deformed post 211a is shown in FIGS. 8B and 8C.

Figure 7:
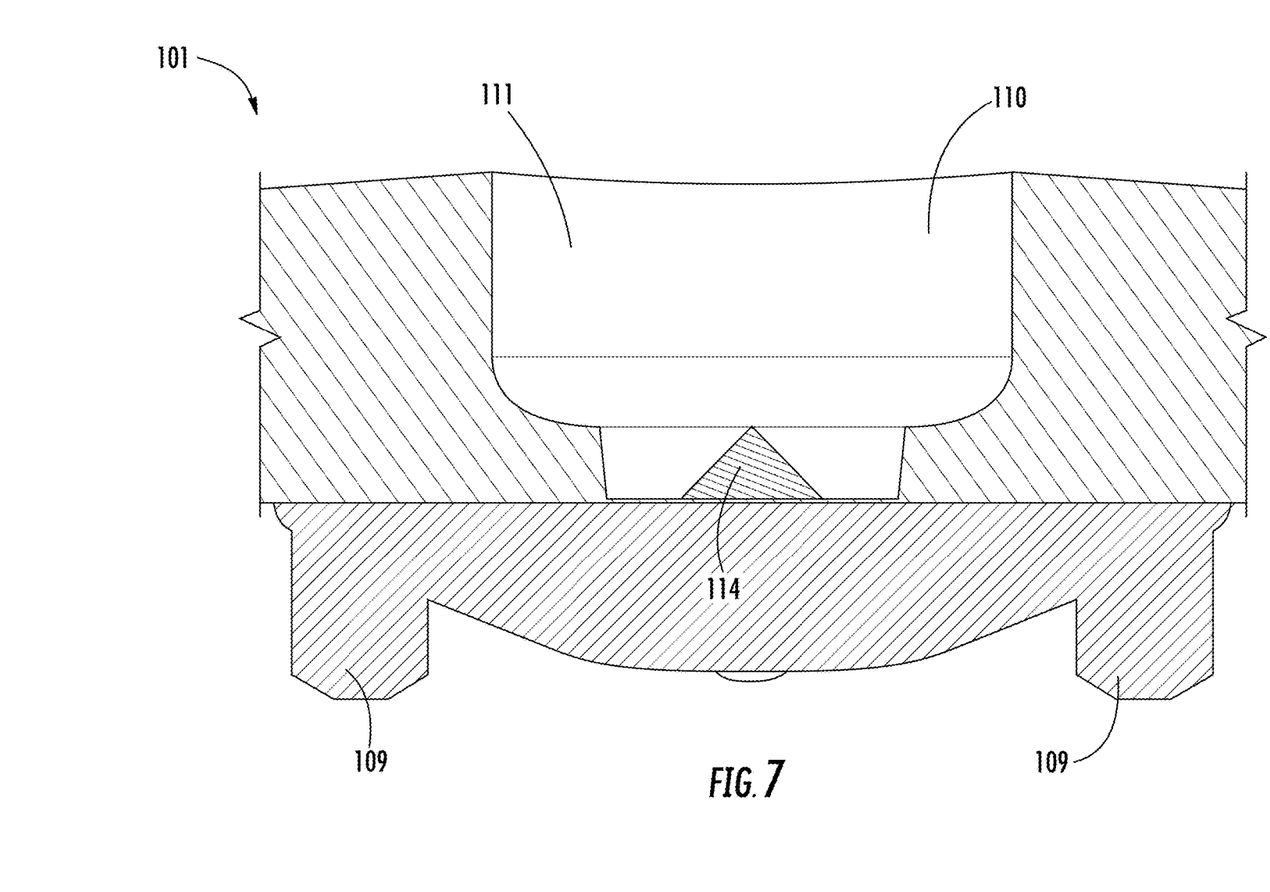
FIG. 7 is a cross section view of the washer of FIG. 5B taken along line 7-7.

As shown in FIGS. 5B-7, in some examples, the washer 101 may include at least one projection 114 that is located adjacent to hole 111 and extends into the cavity 110. FIG. 7 shows a triangular cross section of one projection 114; however, the projection 114 may have any appropriate shape. In some cases, the at least one projection 114 extends in an axial direction (i.e., parallel to the axis of the hole 111 and the post 211). In some cases, the radial direction is approximately perpendicular to the axial direction such that the at least one projection 114 is approximately perpendicular to at least some of the radial protrusion(s) 112.

In some examples, when the post 211 permanently deforms in the cavity 110, the material of the post 211 moves/flows to at least one of (1) the recess(es) 113 in the hole 111 and (2) areas between the projection(s) 114 in the cavity 110. In other words, when the post 211 is deformed, the material of the post 211 may move/deform such that the radial protrusion(s) 112 and/or the projection(s) 114 are embedded within the deformed post 211a. Embedding at least one of the radial protrusion(s) 112 and the projection(s) 114 within the deformed post 211a locks the washer 101 and the cap 201 together such that the two components cannot rotate (about the axis of the hole 111) relative to one another when the cap and washer fastener assembly 100 is in the assembled configuration.

In addition to preventing rotation relative to one another, securing the washer 101 and the cap 201 together (as described above) may help prevent the cap and washer fastener assembly 100 from rotating relative to the layer 10 (i.e., the washer 101 and the cap 201 are prevented from rotating as a single unit relative to the layer 10). Preventing rotation of the cap and washer fastener assembly 100 relative to the layer 10 may be particularly beneficial when there is a desired orientation of the visual indicia 50 of the cap 201. As described above, one or both of the washer 101 and the cap 201 may include serrations 107 (located on the lower surface 203 and/or the upper surface 102) to increase friction at an interface with the layer 10 and help prevent or reduce rotation of the cap and washer fastener assembly 100 relative to the layer 10. In addition to or in lieu of the serrations 107, the cap and washer fastener assembly 100 may include the plurality of protrusions 109 extending from the upper surface 102 of the washer 101 and/or the label 205 with portions that are raised from the cap 201 (these two features, alone or in combination, may also help reduce rotation relative to the layer 10).

The cap and washer fastener assembly 100 may be compared to conventional cap and washer fastener assemblies that do not include serrations 107, the radial protrusion(s) 112, or the projection(s) 114. The cap and washer fastener assembly 100 was tested for three different fabric materials for layer 10. On average, the cap and washer fastener assembly 100 including the serrations 107, the radial protrusion(s) 112, or the projection(s) 114 increased the torque capability of the assembly (compared to the conventional assembly) by approximately 125%. In other words, the addition of serrations 107, the radial protrusion(s) 112, and the projection(s) 114 increased the capability of the assembly to withstand torque and avoid rotating by approximately 125%.

The components of the cap and washer fastener assembly 100 may be formed of any suitable material including, but not limited to, plastic, polypropylene, nylon, other plastic materials, thermoplastic, metallic materials, composite materials, or other similar materials. Moreover, the components of the cap and washer fastener assembly 100 may be attached to one another via molding operations and/or suitable fasteners, which include, but are not limited to, glue or any suitable adhesive, hook and loop fasteners, ultrasonic welding, other mechanical or chemical fasteners.

Also disclosed are methods of assembling the cap and washer assembly 100. In one exemplary method of assembling the cap and washer fastener assembly 100, the cap 201 is aligned with an existing or desired hole in a layer 10 and the cap 201 is moved such that the post 211 is at least partially inserted into the hole in the layer 10. The cap 201 is rotated about the axis of the post 211 until the visual indicia 50 is in the desired orientation (alignment or identification of the desired orientation may occur based on the location of the protrusion 204). The rotation of the cap 201 may occur before or after the post 211 is at least partially inserted into the layer 10. The cap 201 and the washer 101 are located on opposite sides of layer 10 and are aligned such that post 211 is at least approximately coaxial with hole 111. After the cap 201 is in the correct orientation, the cap 201 and the washer 101 are pressed together such that a portion of the post 211 permanently deforms within the cavity 110. The portion of the post 211 that deforms will move/flow to at least one of (1) the recess(es) 113 in the hole 111 and (2) areas between the projection(s) 114 in the cavity 110. In other words, when the post 211 is deformed, the material of the post 211 may move/deform such that the radial protrusion(s) 112 and/or the projection(s) 114 are embedded within the deformed post 211a. Embedding at least one of the radial protrusion(s) 112 and the projection(s) 114 within the deformed post 211a locks the washer 101 and the cap 201 together such that the two components cannot rotate (about the axis of the hole 111) relative to one another when the cap and washer fastener assembly 100 is in the assembled configuration.

Different arrangements of the components depicted in the drawings or described above, as well as components and steps not shown or described are possible. Similarly, some features and sub-combinations are useful and may be employed without reference to other features and sub-combinations. Cases of the invention have been described for illustrative and not restrictive purposes, and alternative cases will become apparent to readers of this patent. Accordingly, the present invention is not limited to the cases described above or depicted in the drawings, and various cases and modifications may be made without departing from the scope of the claims below.

That which is claimed is:

1. A cap and washer fastener assembly comprising:
   a cap with an upper surface and a lower surface, wherein a post extends from the lower surface; and
   a washer with an upper surface, a lower surface, and a hole extending through the upper surface and the lower surface, wherein:
   the upper surface of the washer comprises an outer portion;
   the lower surface of the washer comprises a cavity that is coaxial with the hole;
   the cap and washer fastener assembly comprises an assembled configuration wherein:
   (a) the post of the cap is inserted into the hole of the washer and a portion of the post is permanently deformed within the cavity; and
   (b) a substrate layer is disposed between the cap and the washer such that the lower surface of the cap interfaces with the substrate layer and the upper surface of the washer interfaces with the substrate layer;
   the outer portion comprises a plurality of serrations that increase friction with the substrate layer when the cap and washer fastener assembly is in the assembled configuration;
   the hole comprises a plurality of radial protrusions that extend in a radial direction toward a central axis of the hole; and
   the cavity comprises a plurality of projections adjacent the hole that extend in a projection direction that is approximately parallel to an axial direction of the hole.

2. The cap and washer fastener assembly of claim 1, wherein:
   at least one of the plurality of serrations extends to an outermost edge of the upper surface of the washer;
   the outer portion is ring-shaped; and
   the plurality of serrations cover an entire surface of the outer portion.

3. The cap and washer fastener assembly of claim 1, wherein each of the plurality of serrations comprises a triangular prismatic protrusion that extends in a radial direction of the washer.

4. The cap and washer fastener assembly of claim 1, wherein the hole comprises a plurality of radial protrusions that extend in a radial direction toward a central axis of the hole.

5. The cap and washer fastener assembly of claim 1, wherein the cavity comprises a plurality of projections adjacent the hole and extending along an axial direction of the hole.

6. The cap and washer fastener assembly of claim 1, wherein the radial direction is approximately perpendicular to the projection direction.

7. The cap and washer fastener assembly of claim 1, wherein a center hub of the upper surface of the washer comprises a plurality of protrusions that extend approximately parallel to an axial direction of the hole.

8. The cap and washer fastener assembly of claim 7, wherein the cap comprises a label that extends from the lower surface and that interfaces with the plurality of protrusions extending from the center hub of the washer when the cap and washer fastener assembly is in the assembled configuration such that the substrate layer is disposed between the label and the plurality of protrusions extending from the center hub.

9. A fastener comprising:
   a washer with an upper surface, a lower surface, and a hole extending through the upper surface and the lower surface, wherein:
   the upper surface of the washer comprises a center hub that is coaxial with the hole;
   the lower surface of the washer comprises a cavity that is coaxial with the hole;
   the fastener comprises an assembled configuration wherein the washer interfaces with a substrate layer such that the upper surface of the washer interfaces with the substrate layer; and
   the washer comprises:
   a plurality of projections disposed within the cavity adjacent the hole and extending parallel to an axial direction of the hole.

10. The fastener of claim 9, wherein a plurality of serrations on the upper surface extend to an outermost edge of the fastener.

11. The fastener of claim 10, wherein the plurality of serrations are disposed on an annulus outer portion of the upper surface of the washer.

12. The fastener of claim 10, wherein each of the plurality of serrations comprises a triangular prismatic protrusion that extends in a radial direction of the fastener.

13. The fastener of claim 9, wherein the plurality of projections extend in a direction away from the substrate layer when the fastener is in the assembled configuration.

14. A fastener comprising:
   a washer with an upper surface, a lower surface, and a hole extending through the upper surface and the lower surface, wherein:
   the lower surface of the washer comprises a cavity that is coaxial with the hole;
   the fastener comprises an assembled configuration wherein the washer is disposed adjacent to a substrate layer;
   the hole comprises a plurality of radial protrusions that extend in a radial direction toward a central axis of the hole; and
   the cavity comprises a plurality of projections disposed adjacent the hole extending in a projection direction that is approximately parallel to an axial direction of the hole.

15. The fastener of claim 14, wherein the upper surface of the washer comprises a plurality of serrations to increase friction with the substrate layer.

16. The fastener of claim 15, wherein the plurality of serrations are disposed on an annulus outer portion of the upper surface of the washer.

17. The fastener of claim 15, wherein each of the plurality of serrations comprises a triangular prismatic protrusion that extends in a radial direction washer.

18. The fastener of claim 14, wherein the radial direction is approximately perpendicular to the projection direction.

19. The fastener of claim 14, further comprising a cap with an upper surface and a lower surface, wherein a post extends from the lower surface, wherein, in the assembled configuration, at least one of the radial protrusions of the hole is embedded in a deformed portion of the post.

20. The fastener of claim 14, further comprising a cap with an upper surface and a lower surface, wherein a post extends from the lower surface, wherein, in the assembled configuration, at least one of the projections of the cavity is embedded in a deformed portion of the post.

* * * * *